Patented Jan. 18, 1938

2,105,984

UNITED STATES PATENT OFFICE 2,105,984

WOOD STAINING

Charles G. Moore, Lakewood, and Milton Zucker Cleveland, Ohio, assignors to The Glidden Company, Cleveland, Ohio, a corporation of Ohio No Drawing. Application October 31, 1929, Serial No. 403,908

6 Claims. (Cl. 134—48)

In the former system of wood finishing by varnish, the staining of the wood was a relatively simple operation. Benzol-soluble dyes (which can be made sufficiently light-resistant for furniture work and the like) were mixed to the desired shade, and applied. These readily dried, and the pores of the wood were then filled with a filler composition consisting of pigment mixed with oil, drier and aliphatic hydrocarbon thinners. The varnish coats which were then applied also contained aliphatic hydrocarbon or turpentine. In no case was a solvent for the dye present in the top coats, and the dye remained in the wood and no trouble was encountered. With the advent of wood lacquers however, a new series of solvents came into use, including alcohols, esters and the aromatic hydrocarbons, benzol, toluol and xylol. The use of lacquers over the old type of stains was found to result in some of the dye leaving the wood and going into solution in the top coating. This produced two bad effects. In mixed color stains, the dyes often tended to bleed unevenly into the lacquer coating, thereby resulting in a change of color; and the acid in the benzol dyes often rotted the lacquer film, destroying its toughness and adhesion. Attempts were made to dissolve the dyes in alcohol, but no colors were obtainable that were thus soluble and at the same time sufficiently resistant to light. Water-soluble acid dyes, which had been used to a limited extent on very high grade varnish work, were next brought into use in this connection. These colors (of the diazo type for the greatest part) have a relatively good resistance to the action of light, and do not tend to bleed into the lacquer film, being largely insoluble in lacquer solvents. These stains however, have a very serious disadvantage, which has prevented their more general use. When water or an aqueous solution is applied to wood, it is absorbed and the fiber of the wood is raised. The filling operation follows the staining. Unless the wood is perfectly smooth for the filling operation, the filler does not wipe off well, and gray marks are left in the uneven portions of the wood where pigment has covered the stain. The fibers raised by the water must therefore be sanded down. In order to do this properly, a wash coat of shellac (about one-half pound per gallon of alcohol) must be applied. This stiffens the wood fibers so that the sand paper will cut them easily. It can readily be seen that this shellacking and sanding requires time and labor, so that the cheaper and better water stains were not used extensively.

In accordance with our present invention, the desirable features of water soluble stains however may be made available without objectionably raising the fiber of the wood. In accordance with our invention, the water requisite for the solution of the dye is mixed with organic solvents such as to control the tendency to raise the fiber. The organic solvents seem to exert a protective action on the wood fiber, preventing the water from soaking into the cells. By properly proportioning the water and organic solvents, so that all the water evaporates before the organic solvent, there will be no fiber-raising, as there is nothing left in the wood to produce such effect. The evaporation rates of the various solvents depend largely upon the temperature; the evaporation rate of water however, varies also with the relative humidity of the atmosphere. A mixture of water with an organic solvent will, therefore, raise the fiber of the wood at one temperature and humidity and not at another, unless properly proportioned. The proportion is thus such for the ingredients that there will be no fiber-raising at any working temperature or humidity. We have further found that different woods will act in different ways with respect to stain solutions, some showing a greater tendency to raise the fiber than others. Close grained woods such as walnut give little trouble; but an open grained wood like figured mahogany is very difficult to handle. Another point requiring consideration is the fact that the water-soluble dyes are not as soluble in organic solvents. The proportioning therefore must be such as to not only hold the fiber down, but also have the least tendency to precipitate the dye. Furthermore, extremely high-boiling solvents can not be used, since these evaporate too slowly and leave the wood greasy, and thus not ready for the filler. These greasy residues are also often hygroscopic, and they may pick up enough water from the air to not only saturate the substance, but also to raise the fiber. As solvents which may be used with water to produce desirable results, we may employ glycerol, glycol, the glycol ethers and esters, di-ethylene glycol, and its ethers and esters, ethyl lactate, methyl and ethyl alcohols, iso-propyl alcohol, acetone, etc. Sufficient slow evaporating solvent must be added to the water to prevent raising of the fiber; while more rapidly evaporating solvents such as alcohol and acetone are used with these to speed the drying and reduce the cost. Glycerol and the glycols should in general not be used in amounts exceeding 2–3%, since larger amounts will leave a greasy residue. The glycol ethers such as the monomethyl and mono-ethyl ethers of ethylene glycol, may be used in any proportion. Ethyl lactate may also be used in almost any amount.

As illustrative of the invention, the following examples may be noted:

I. A very desirable combination may be made up of

¼ part of water soluble dye,
2 parts of water,
5 parts of ethyl lactate,
3 parts of methanol denatured alcohol, all proportions being by weight.

The dye is dissolved in the water, the ethyl lactate is added, and then the alcohol. This composition has very good solvent action on dyes, and will not raise the fiber on any wood at working humidity. It is a trifle slow in evaporating, but does not leave a greasy residue.

II. Another desirable embodiment of our invention may comprise

2½ parts of dye,
15 parts of water,
70 parts of the mono-ethyl ether of ethylene glycol (known in the trade as cellosolve),
15 parts of methanol denatured alcohol, all proportions being by weight.

This composition is superior in speed of evaporation, but does not keep dyes in solution quite as well.

III. Where the stain is not to be subjected to unusual conditions of humidity, or where only close-grained woods are to be used, it is safe to replace more of the high boiling thinner with alcohol. For instance a good stain for walnut veneer may comprise 2½ parts of dye,
15 parts of water,
50 parts of mono-ethyl ether of ethylene glycol,
35 parts of alcohol, all proportions being by weight.

This stain may raise the grain on such woods as mahogany at relative humidities of 60% or higher, and on particularly bad pieces of wood it may raise the fiber on a rather dry day.

IV. It is also possible to make up these stain solutions in concentrated form, and reduce them for use to the desired color strength with a mixture of 50 parts by volume of alcohol, and
50 parts by volume of mono-ethyl ether of ethylene glycol.

V. Instead of using a high percentage of medium-high boiling solvents such as ethyl lactate or mono-ethyl ether of ethylene glycol, it is possible to replace some of this by a mixture of very high boiling solvent and alcohol, for instance 2½ parts of dye,
15 parts of water,
2 parts of glycerol,
58 parts of mono-ethyl ether of ethylene glycol,
25 parts of alcohol, all proportions being by weight.

This stain composition is very nearly the equal of that of Example II. It is important however not to raise the percentage of glycerol, since further addition will cause a slight greasiness, with resultant hygroscopicity and fiber-raising at very high humidities (more than 85%).

Other modes of applying the principle of the invention may be employed, change being made as regards the details described, provided the ingredients or steps stated in any of the following claims, or the equivalent of such, be employed.

We therefore particularly point out and distinctly claim as our invention:—

1. A dye solution for use as a wood stain, consisting of a dye dissolved in water, an organic solvent miscible with water, and ethyl lactate.

2. A dye solution for use as a wood stain, consisting of a dye dissolved in water, ethyl lactate, and alcohol.

3. A dye solution for use as a wood stain, consisting of a dye dissolved in water, mono-ethyl ether of ethylene glycol, and alcohol.

4. A dye solution for use as a wood stain, consisting of about ¼ part of dye dissolved in two parts of water, about 5 parts of ethyl lactate, and about 3 parts of methanol denatured alcohol.

5. A dye solution for use as a wood stain, consisting of about 2½ parts of dye dissolved in 15 parts of water, about 70 parts of mono-ethyl ether of ethylene glycol, and about 15 parts of methanol denatured alcohol.

6. A dye solution for use as a wood stain consisting of a dye dissolved in water, a high boiling organic miscibilizing solvent selected from the group consisting of ethyl lactate and mono-ethyl ether of ethylene glycol, and alcohol.

CHARLES G. MOORE.
MILTON ZUCKER.